(12) United States Patent
Guemmer (10) Patent No.: US 8,152,445 B2
(45) Date of Patent: Apr. 10, 2012

(54) FLUID FLOW MACHINE WITH FLUID INJECTOR ASSEMBLY

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 507 days.

(21) Appl. No.: 12/385,461

(22) Filed: Apr. 8, 2009

(65) Prior Publication Data
US 2009/0252596 A1 Oct. 8, 2009

(30) Foreign Application Priority Data

Apr. 8, 2008 (DE) .......................... 10 2008 017 844

(51) Int. Cl.
F03B 11/00 (2006.01)
(52) U.S. Cl. ...................................... 415/58.5; 415/58.7
(58) Field of Classification Search ................ 415/58.5, 415/58.7
See application file for complete search history.

(56) References Cited

U.S. PATENT DOCUMENTS

| | | | |
|---|---|---|---|
| 2,828,608 A | 4/1958 | Christopher et al. | |
| 3,238,718 A | 3/1966 | Hill | |
| 3,685,741 A * | 8/1972 | O'Sickey | 239/406 |
| 4,097,188 A * | 6/1978 | Forster | 415/202 |
| 4,373,325 A | 2/1983 | Shekleton | |
| 4,870,826 A | 10/1989 | Daguet et al. | |
| 4,891,936 A | 1/1990 | Shekleton et al. | |
| 4,989,404 A | 2/1991 | Shekleton | |
| 5,001,895 A | 3/1991 | Shekleton et al. | |
| 5,205,117 A | 4/1993 | Shekleton et al. | |
| 5,214,911 A | 6/1993 | Shekleton | |
| 5,317,864 A | 6/1994 | Shorb et al. | |
| 6,071,076 A * | 6/2000 | Ansari et al. | 416/168 R |
| 6,261,053 B1 * | 7/2001 | Anderson et al. | 415/115 |
| 7,052,231 B2 | 5/2006 | Wilusz | |
| 7,565,794 B2 | 7/2009 | Eroglu et al. | |
| 7,654,088 B2 | 2/2010 | Shafique et al. | |
| 7,967,556 B2 | 6/2011 | Guemmer | |

FOREIGN PATENT DOCUMENTS

| | | |
|---|---|---|
| DE | 102004030597 | 1/2006 |
| DE | 102005015152 | 10/2006 |
| EP | 700498 | 3/1996 |
| EP | 1205635 | 5/2002 |
| WO | 9428351 | 12/1994 |
| WO | 95/16881 | 6/1995 |

OTHER PUBLICATIONS

German Search Report dated Mar. 20, 2008 from related foreign application.

* cited by examiner

Primary Examiner — Matthew Landau
Assistant Examiner — Robert Bachner
(74) Attorney, Agent, or Firm — Timothy J. Klima; Shuttleworth & Ingersoll, PLC (57) ABSTRACT

A fluid flow machine has a flow duct confined by a wall of a casing, with a fluid supply chamber being arranged in an area of the wall, which is in flow connection with an injector insert. The injector insert is provided with an injector nozzle for supplying fluid from the fluid supply chamber into the flow duct. The injector insert is closely connected to the wall of the fluid supply chamber.

20 Claims, 14 Drawing Sheets

(1) Rotor end on the casing

(1) Stator end on the hub

$$\arctan[\tan(90°-\lambda)+1] < \alpha < \arctan[\tan(90°-\lambda)+4]$$

FLUID FLOW MACHINE WITH FLUID INJECTOR ASSEMBLY

This application claims priority to German Patent Application DE102008017844.6 filed Apr. 8, 2008, the entirety of which is incorporated by reference herein.

This invention relates to a fluid flow machine.

The present invention relates to fluid flow machines, such as blowers, compressors, pumps and turbines of the axial, semi-axial and radial type. The working medium or fluid may be gaseous or liquid.

The fluid flow machine may include one or several stages, each of which having of a rotor and a stator.

The rotor includes a number of blades which are connected to the rotating shaft of the fluid flow machine. The rotor may be shrouded or feature a free blade end at the casing. The stator includes of a number of stationary vanes which, on the casing side, have a fixed vane end.

The fluid flow machine may be provided with a special type of stator upstream of the first rotor, a so-called inlet guide vane assembly.

At least one stator or inlet guide vane assembly, instead of being fixed, can be variable to change the angle of attack. A spindle accessible from the outside of the annulus duct can, for example, accomplish such a variation.

In a special embodiment, the fluid flow machine may be provided with at least one row of variable rotors.

The aerodynamic loadability and the efficiency of fluid flow machines such as blowers, compressors, pumps, fans and turbines, is limited in particular by the growth and the separation of boundary layers near the casing wall.

The state of the art provides solutions to this problem only to a limited extent. The numerous concepts existing for fluid supply to the turbine blades essentially provide for surface cooling, not for energizing the boundary layers. Furthermore, concepts are known for compressor rotors for the supply of air on hub and casing by axially-symmetric slots to influence the wall boundary layers there. Finally, concepts exist in which rotors in a casing vicinity are blown at by individual injector nozzles arranged as obstructions in the gas flow to favorably influence the radial gap flow there.

While the general concept of influencing the boundary layers by insufflation or fluid supply is contained in the state of the art, the known solutions are effective to only a limited extent and very restricted as regards their practical applicability. Important for the implementability and effectivity of fluid introduction into the flow path of a fluid flow machine is the shape and positioning of the injector nozzle. Especially as far as the leakage-free design of the components used for the creation of the fluid flow is concerned, there is a lack of practicable solutions in the state of the art.

Figure 1:
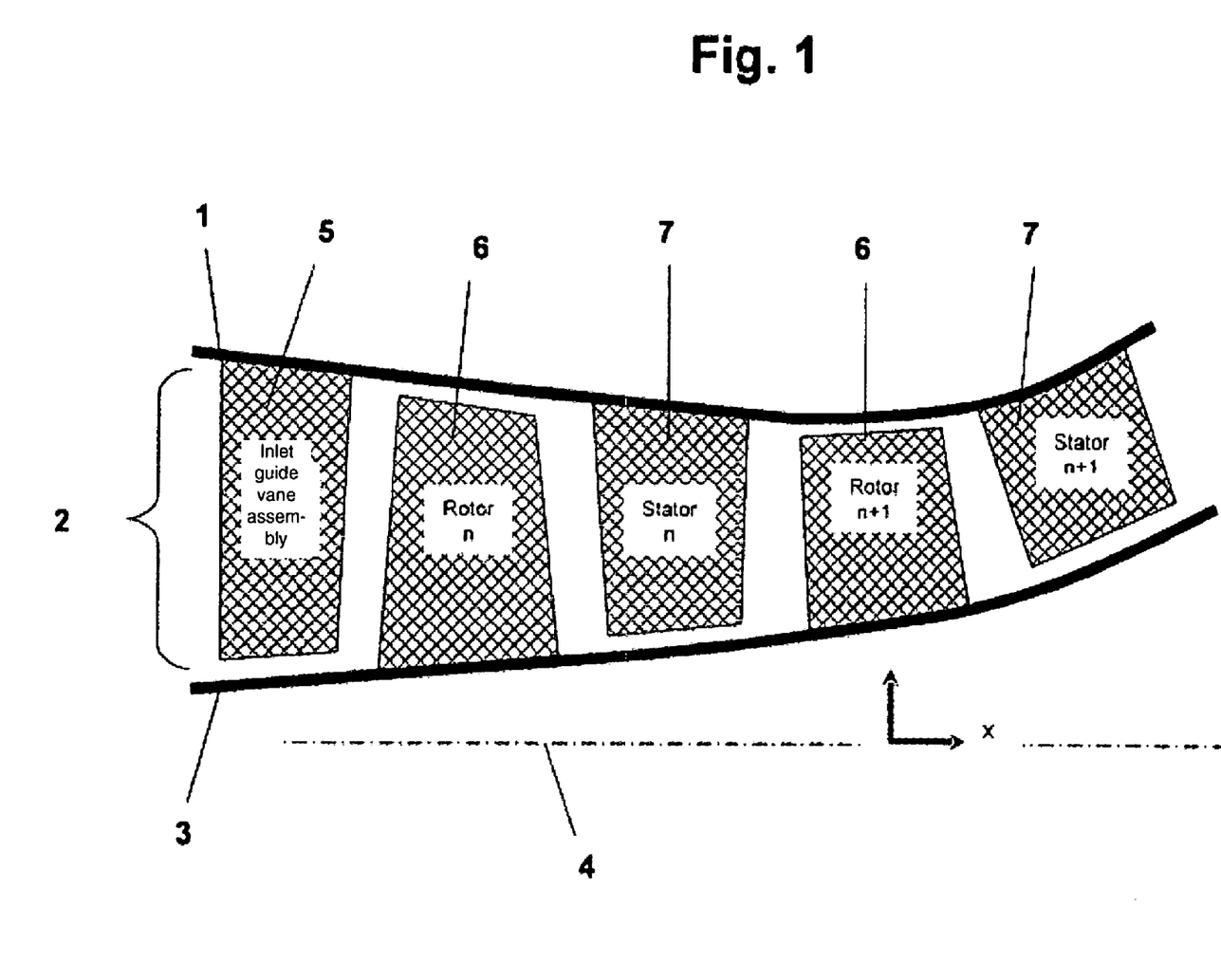
FIG. 1 is a sketch of a fluid flow machine on the example of a compressor.

FIG. 1 schematically shows a fluid flow machine in meridional view, on the example of a compressor including an annulus duct 2 which is confined inwardly by a hub contour 3 and outwardly by a casing contour 1 and is provided with a number of rotor blade rows 6 and stator vane rows 7 within the annulus duct 2. Non-bladed spaces exist between the blade rows. As indicated by the large arrowhead (see FIG. 2, in an x direction), the fluid flow machine is flown from the left-hand side. Introduction of fluid via one or more suitable injectors is advantageous at any point of the annulus duct boundaries (wetted hub and casing surfaces). Specification DE 10 2004 030 597 A1 shows a first solution. That publication proposes special injector nozzles 10 provided on the stator component, see FIG. 2.

A broad aspect of the present invention is to provide a fluid flow machine of the type specified at the beginning above which, while avoiding the disadvantages of the state of the art, enables optimum flow guiding.

More particularly, the present invention relates to a fluid injector assembly for the injector insert in fluid flow machines, with an injector insert including the injector nozzle duct as a central element for leakage-free introduction of fluid into the main flow path of the fluid flow machine.

The solution according to the present invention is characterized by a variety of merits and advantages.

It is thus ensured, in particular, that no accidental leakage flows occur which disturb the course of flow in the annulus duct or the main flow duct as well as the discharge from the injector nozzles. If configurations according to the state of the art are used for injector nozzles, i.e. nozzles provided directly in a blade component or a casing or hub component, respectively, the usually loose fit between the components entails a large number of small openings and gaps which permit fluid to accidentally escape without having passed the injector nozzle. This leads to marked leakage flows affecting the performance characteristics of the fluid flow machine. In contrast, the present invention provides for unhindered, positively controllable flow in the rim area.

The present invention accordingly provides for a special arrangement of a fluid injector assembly for application in fluid flow machines by which an efficient and leakage-free rim jet generation at the confining walls of the main flow path is obtained.

The present invention is more fully described in light of the accompanying drawings showing preferred embodiments. In the drawings.

Figure 2:
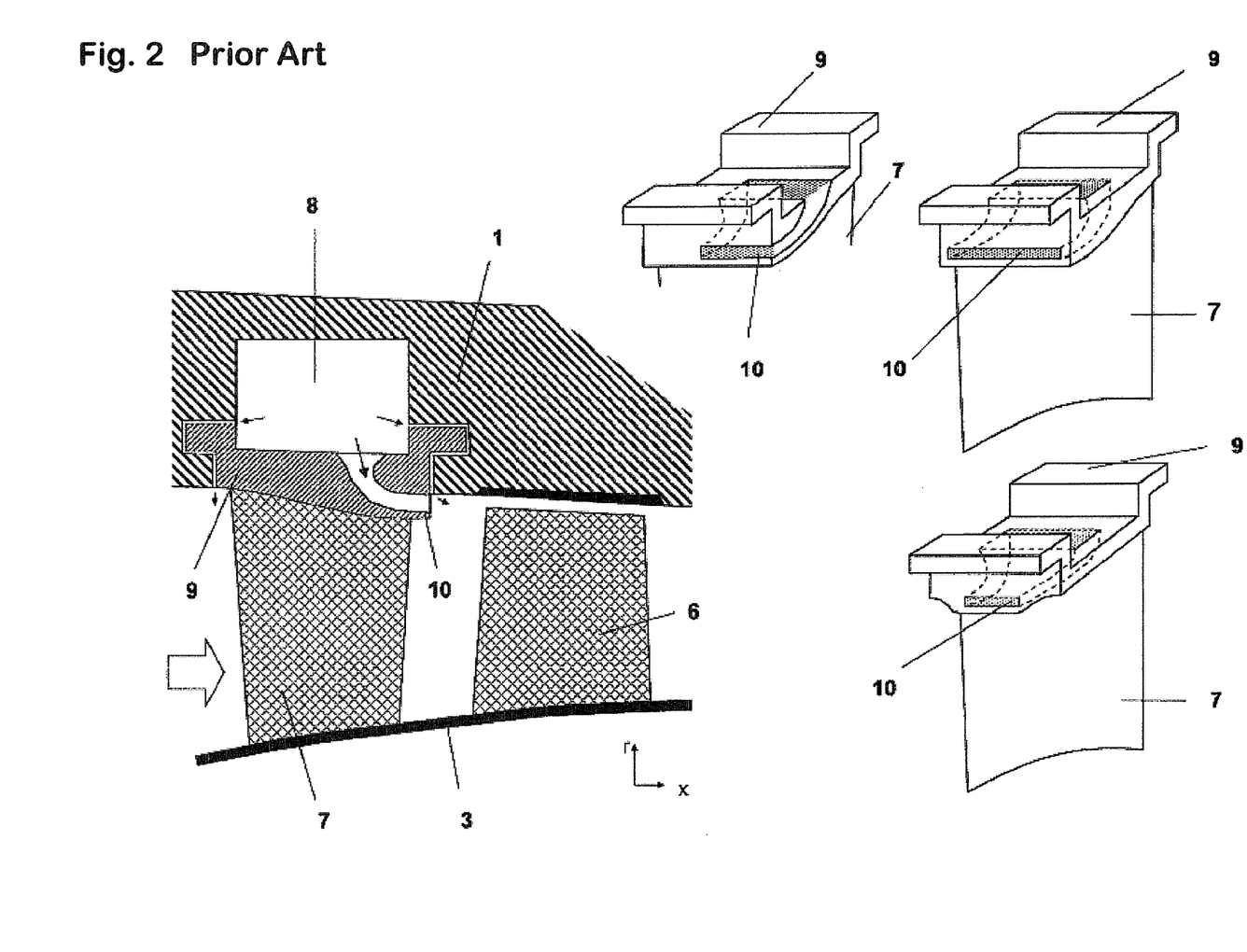
FIG. 2 shows a fluid injector assembly in accordance with the state of the art.

FIG. 2 shows a fluid injector assembly in accordance with the state of the art. A fluid supply chamber 8 directly adjoins the blade and casing components, between which a functionally inherent clearance exists, permitting fluid to escape through gaps or openings existing permanently or occurring under certain operating conditions without having passed the injector nozzle 10. In the state-of-the art example here shown, the injector nozzle 10 is arranged within a blade component.

Figure 3A:
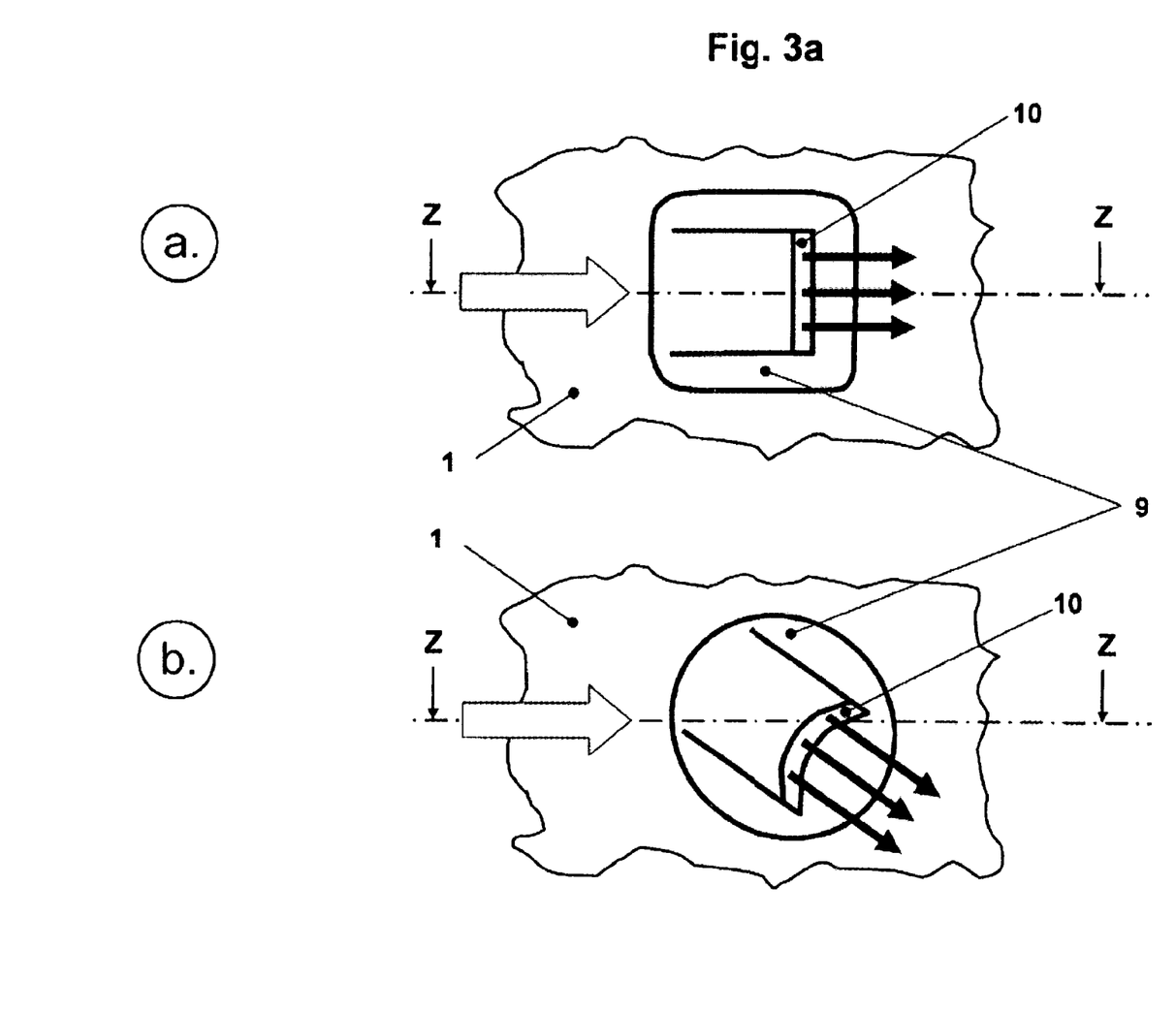
FIG. 3a shows a fluid injector assembly in accordance with the present invention, looking at a hub or casing surface of the main flow path.

FIG. 3a shows the solution of a fluid injector assembly in accordance with the present invention. The view is from the interior of the main flow path (annulus duct of the fluid flow machine) to the surface of one of the main flow path walls of the fluid flow machine. FIG. 3a contains two partial figures in each of which the meridional flow direction in the fluid flow machine is indicated by a large arrowhead. The surface, which is represented as cutout zone in the two partial figures of FIG. 3a, can appertain to at least one hub component 3 (e.g. rotor drum or rotor platform) or to at least one casing component 1 (e.g. casing shell or stator platform). As a central and particularly characteristic component of the fluid injector assembly an injector insert 9 is provided which houses the injector nozzle 10 and which, in accordance with the present invention, extends from a fluid supply chamber 8 through at least one hub or casing component to the main flow path. Here, the injector insert 9 is connected in a firm and leakage-free manner to at least one component forming the fluid supply chamber 8. With all other components belonging to the assembly, the injector insert 9 can form a loosely connected arrangement which may also be permitted to have gaps.

The front face of the injector insert 9 and the nozzle exit located on the front face are shown in the partial figures a) and b). The issuing injector jet is shown by small arrowheads. According to the present invention, the injector jet can be directed in the meridional flow direction or, in a particularly favorable form, be inclined to the meridional flow direction at a certain angle. Further characteristics of the arrangement become apparent from the marked meridional section Z-Z through the fluid injector assembly, see FIGS. 4, 5, 6, 8, 10, and 12.

Figure 3B:
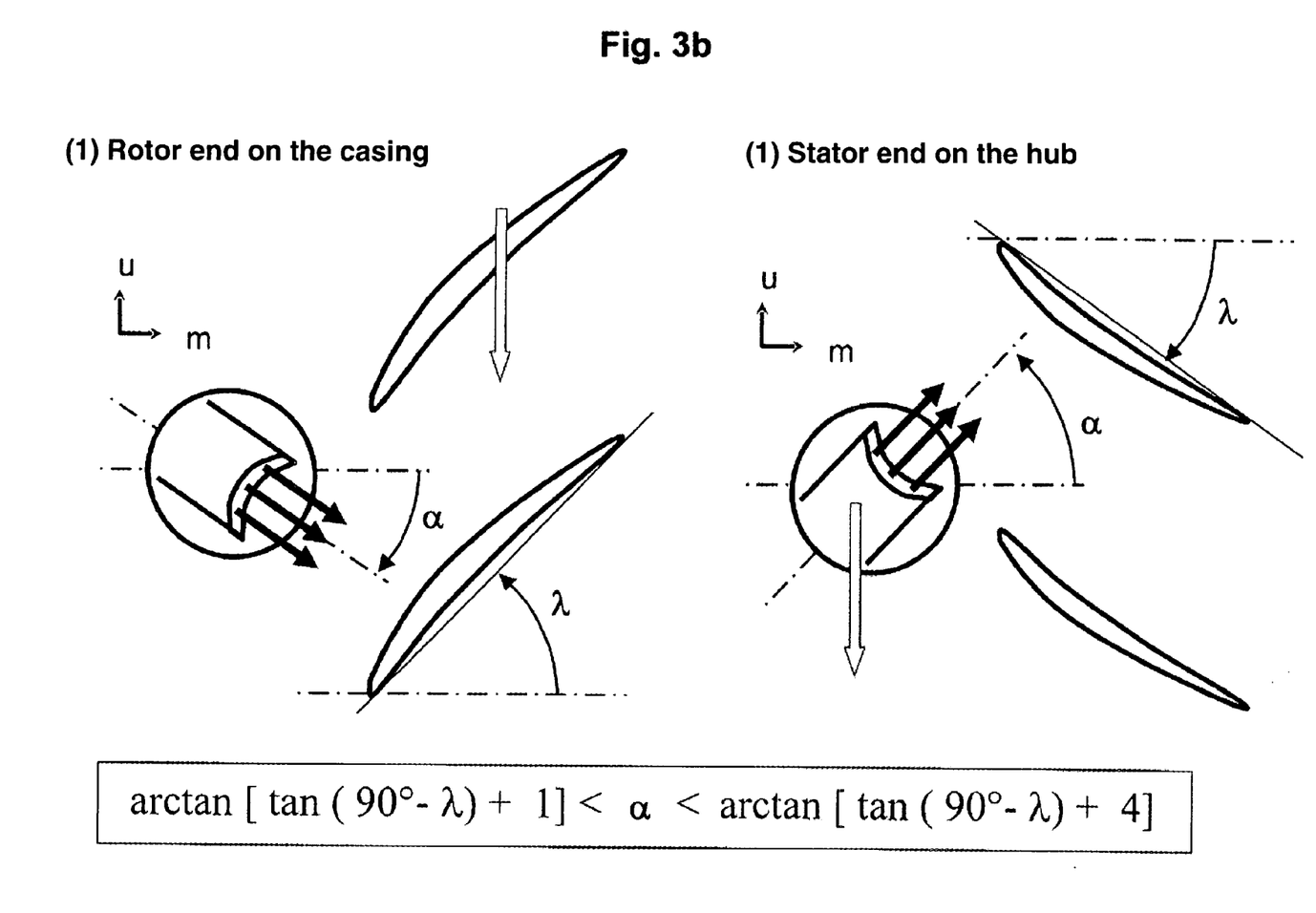
FIG. 3b shows the inclined orientation of the injector jet in accordance with the present invention with relative movement between injector and blade row.

FIG. 3b exemplifies, in the plane set up by the meridional flow direction m and the circumferential direction u, two injector assemblies according to the present invention of an arrangement of injector and a blade row impinged by it, with the injector and the blade row being in relative movement to each other. Arrangement (1) shows an injector in the area of a rotor blade row on the casing. The rotor blade orientation is indicated by a large arrowhead. In accordance with the present invention, the orientation of the injector has a component in the direction of rotation of the rotor, i.e. a positive orientation inclination angle α. The inclination angle α is signed positive, as shown in the left-hand part of FIG. 3b.

The arrangement (2) shows an injector in the area of a stator on the hub. In accordance with the present invention, the orientation of the injector has a component against the direction of rotation of the injector. The inclination angle α, in accordance with the present invention, has to be signed positive also in this case, as shown in the right-hand part of FIG. 3b.

It is particularly favorable in accordance with the present invention, if for the angle α, values are provided in the range defined as follows:

$$\arctan[\tan(90°-\lambda)+1] < \alpha < \arctan[\tan(90°-\lambda)+4],$$

with lambda (λ) being the stagger angle of the blades at the blade end of the respective rotor or stator (see FIG. 3b).

Figure 4:
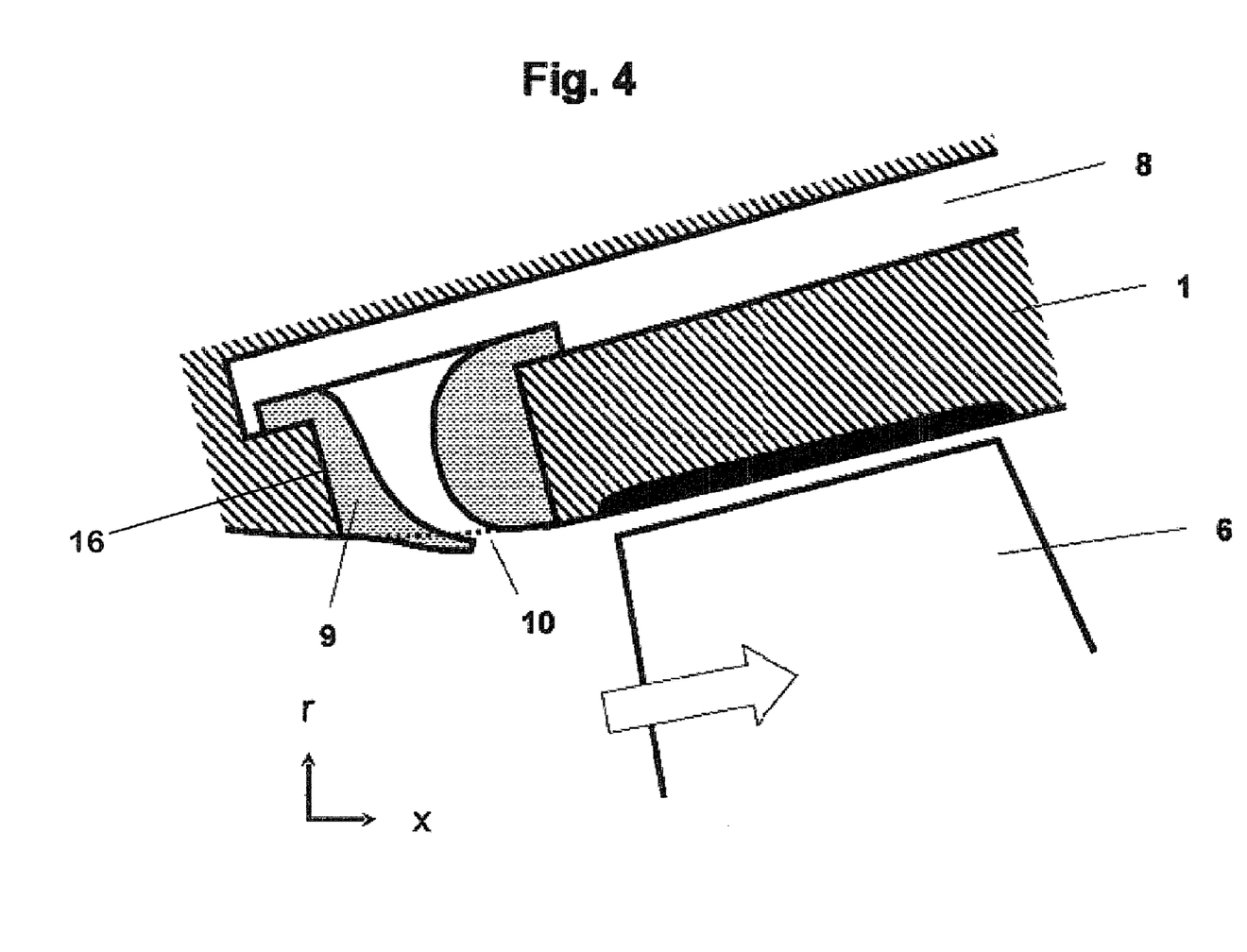
FIG. 4 shows a fluid injector assembly in accordance with the present invention along section Z-Z, with the injector insert upstream of a blade row with a radial gap.

FIG. 4 shows a fluid injector assembly according to the present invention in the meridional plane of the fluid flow machine set up by the axial direction x and the radial direction r. The main flow of the machine passes approximately from the left to the right, as indicated by a large arrowhead. The fluid injector insert 9 according to the present invention, which is connected to the fluid supply chamber 8 in a firm and leakage-free manner, is here arranged such that it is inserted in the wall of the fluid supply chamber in the direction of the main flow path. In accordance with the present invention, the fluid injector insert 9 and the fluid injector chamber 8 are connectable by a threaded connection, a welded connection, an interference fit or any other firm and non-leaking type of connection.

The fluid injector insert 9 in accordance with the present invention is provided here upstream of the leading edge of a free blade end of a rotor blade 6 or stator vane row with radial gap.

Figure 5:
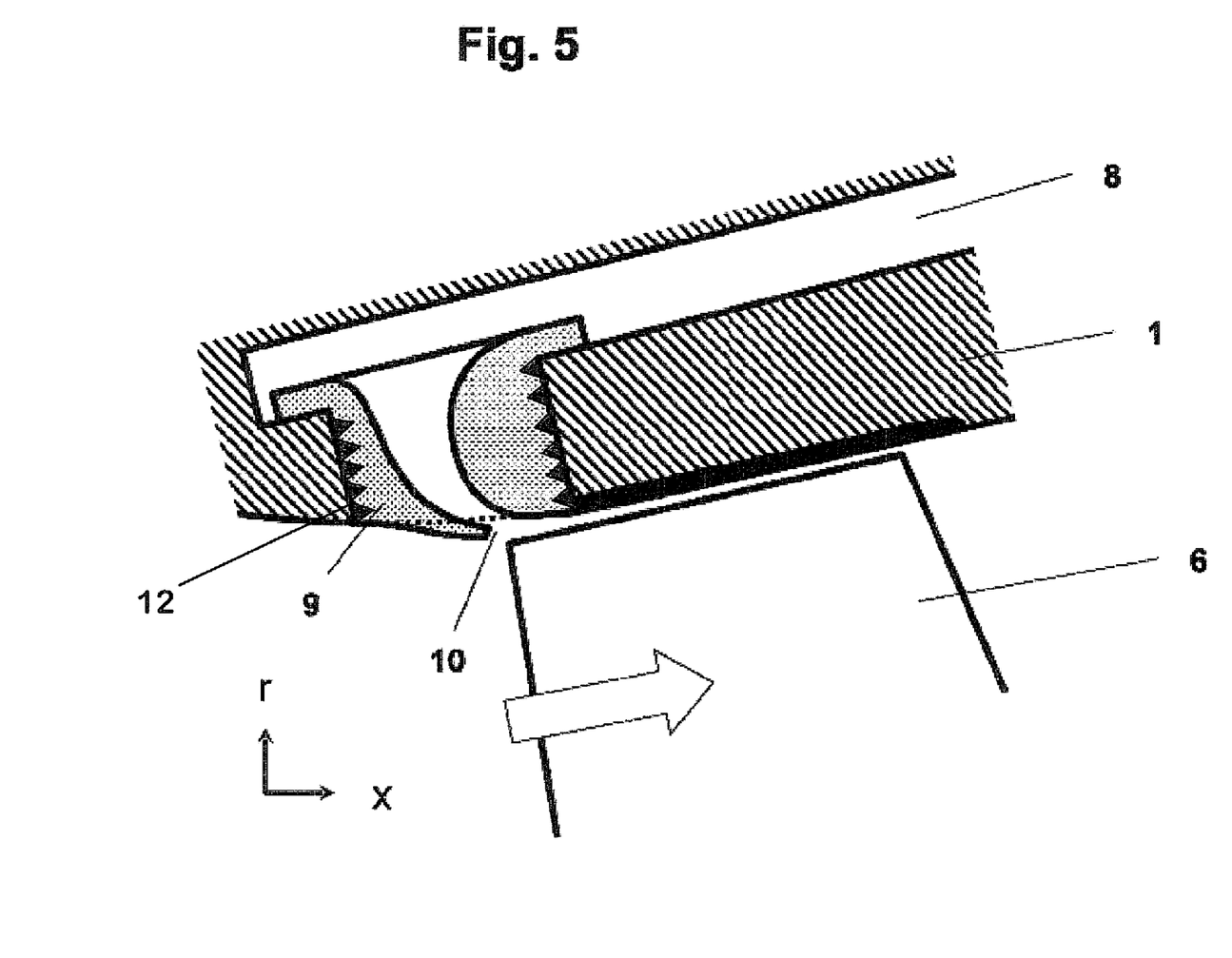
FIG. 5 shows a fluid injector assembly in accordance with the present invention along section Z-Z, with the injector insert in the running area of a blade row with a radial gap.

FIG. 5 also shows a fluid injector assembly in accordance with the present invention in the meridional plane of the fluid flow machine set up by the axial direction x and the radial direction r. The fluid injector insert 9 in accordance with the present invention is here partly provided in the radial gap area of a free blade end of a rotor blade 6 or stator vane row with radial gap. In accordance with the present invention, the fluid injector insert 9 may also be entirely disposed in the area of the radial gap and be an element in the formation of the latter.

Figure 6:
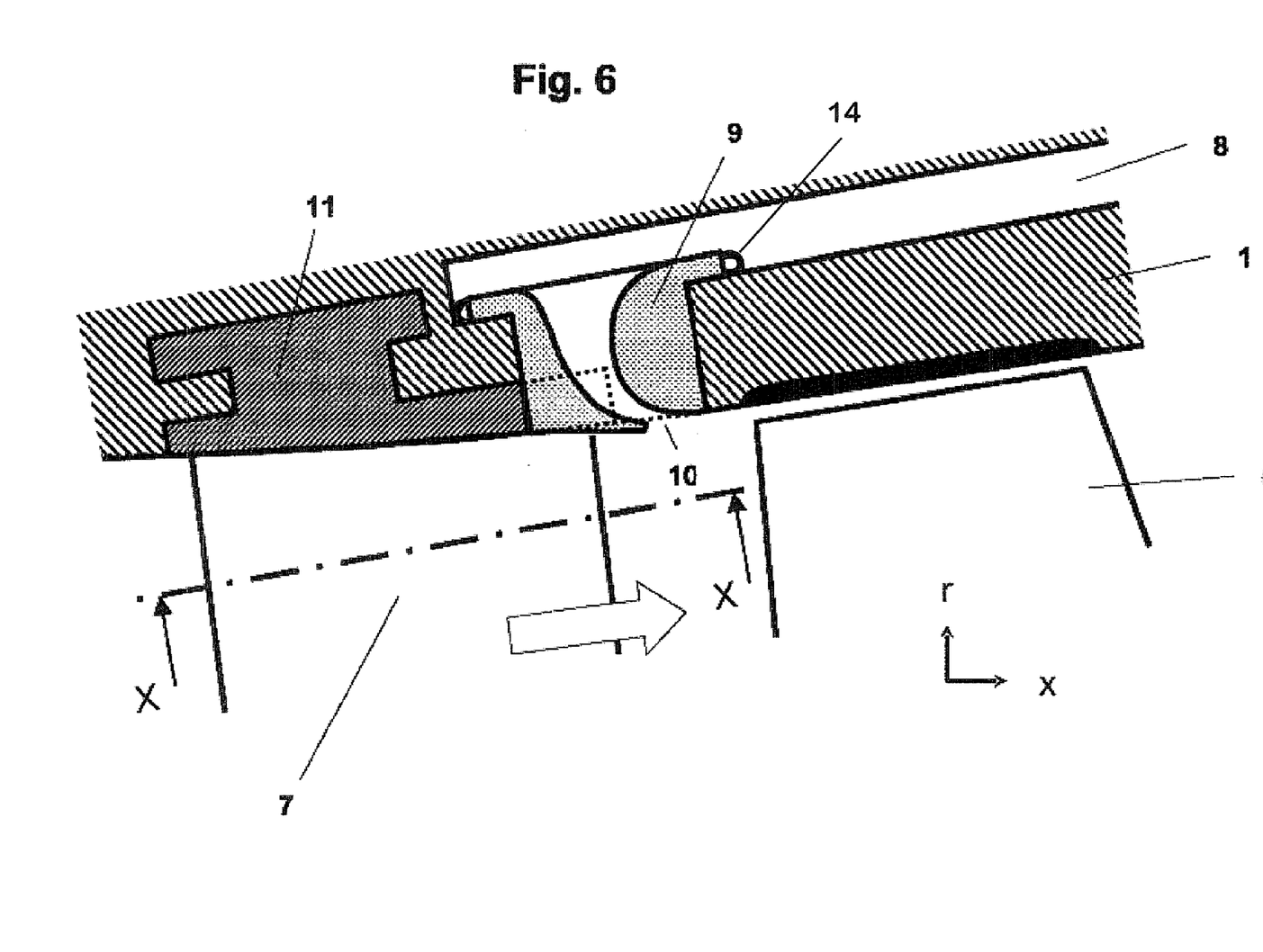
FIG. 6 shows a fluid injector assembly in accordance with the present invention along section Z-Z, with the injector insert in the area of a blade root (fixed blade end)

In FIG. 6, the fluid injector insert 9 is, in accordance with the present invention, provided in the area of a blade root 11 of a rotor blade row 6 or a stator vane row 7 (fixed blade end) such that the fluid injector insert 9 engages the bladed space and, thus, the blade trailing edges—if blade platforms exist also the platform trailing edges—are arranged downstream of confining edges of the fluid injector insert 9.

The representation here selected shows a blade row with platform and root, but a corresponding arrangement of the fluid injector insert 9 will also fall within the scope of the present invention provided that the blades and the contour forming the main flow path rim appertain to an integral, common component.

Figure 7:
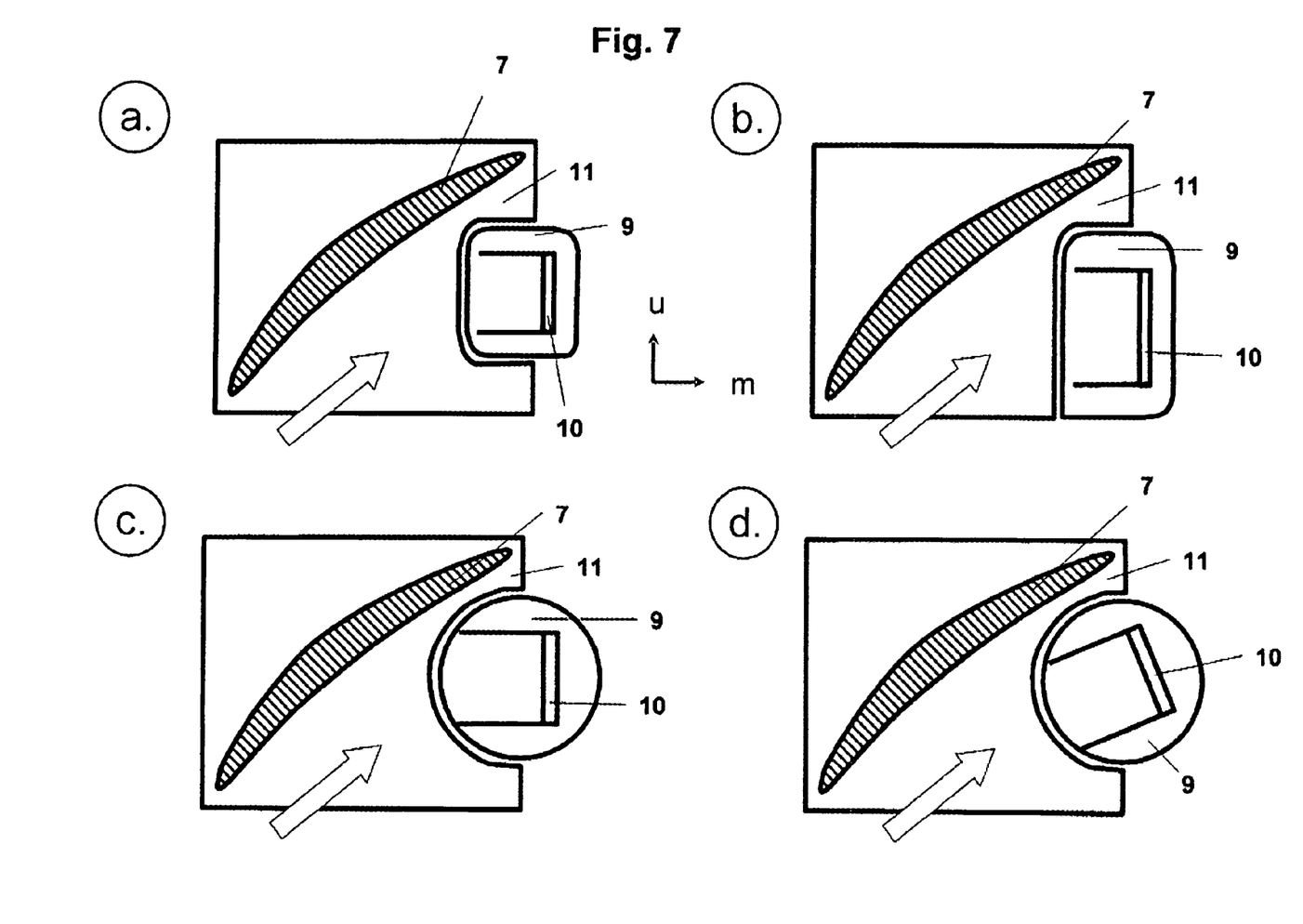
FIG. 7 shows a fluid injector assembly in accordance with the present invention along view X-X, with the injector insert in the area of a blade root.

Further characteristics of the solution according to the present invention are described in conjunction with section X-X, see FIG. 7.

FIG. 7 shows the arrangement according to the present invention in section X-X by way of four examples. All partial figures of FIG. 7 represent a blade platform on which a blade profile is provided. In the four partial figures, different types of engagement of the fluid injector insert 9 into the bladed space and into the blade platform 11 are shown. Partial figure a) shows a fluid injector insert 9 which approximately centrally engages the platform and essentially is oriented in the meridional direction m. Partial figure b) shows an engagement of the fluid injector insert 9 on the blade pressure side towards the platform side, with orientation being essentially in the meridional direction m. Partial figure c) shows a round fluid injector insert 9 which approximately centrally engages the platform and essentially is oriented in the meridional direction m. Partial figure d) shows a round fluid injector insert 9 which approximately centrally engages the platform and is inclined to the meridional direction m at a certain angle. The shape of the blade platform 11 is here shown rectangular, but blade platforms of the parallelogram type can also be part of a solution according to the present invention such that the fluid injector insert 9, if applicable, engages two adjacent blade platforms or two adjacent blade roots, respectively.

Figure 8:
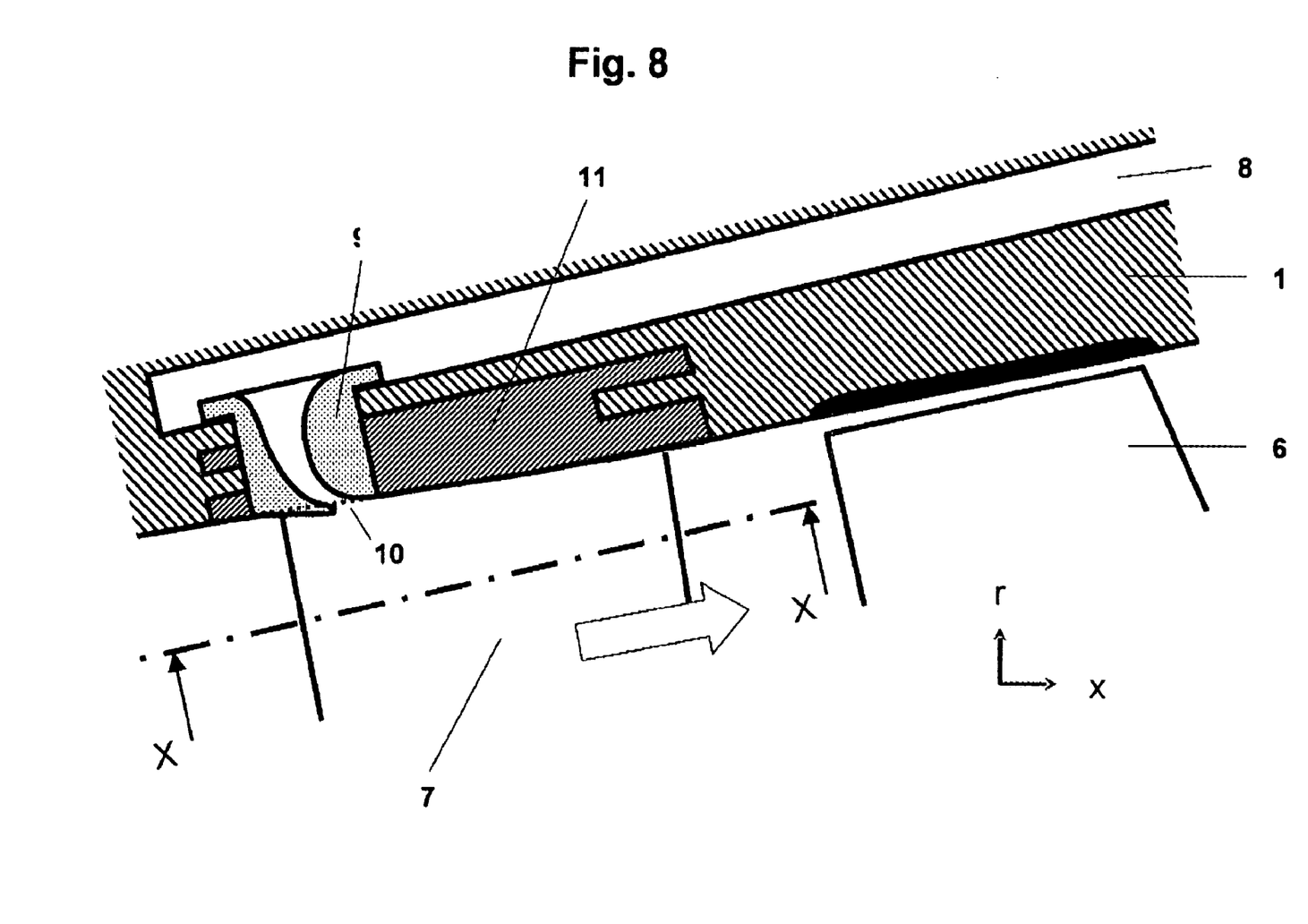
FIG. 8 shows a fluid injector assembly in accordance with the present invention along section Z-Z, with the injector insert in the area of a blade root (fixed blade end)

In FIG. 8, the fluid injector insert 9 is, in accordance with the present invention, provided in the area of a blade root 11 of a rotor blade row 6 or a stator vane row 7 (fixed blade end) such that the fluid injector insert 9 engages the bladed space and, thus, the blade leading edges—if blade platforms exist also the platform trailing edges—are arranged upstream of confining edges of the fluid injector insert 9. The representation here selected shows a blade row with platform and root, but a corresponding arrangement of the fluid injector insert 9 will also fall within the scope of the present invention provided that the blades and the contour forming the main flow path rim appertain to an integral, common component.

Figure 9:
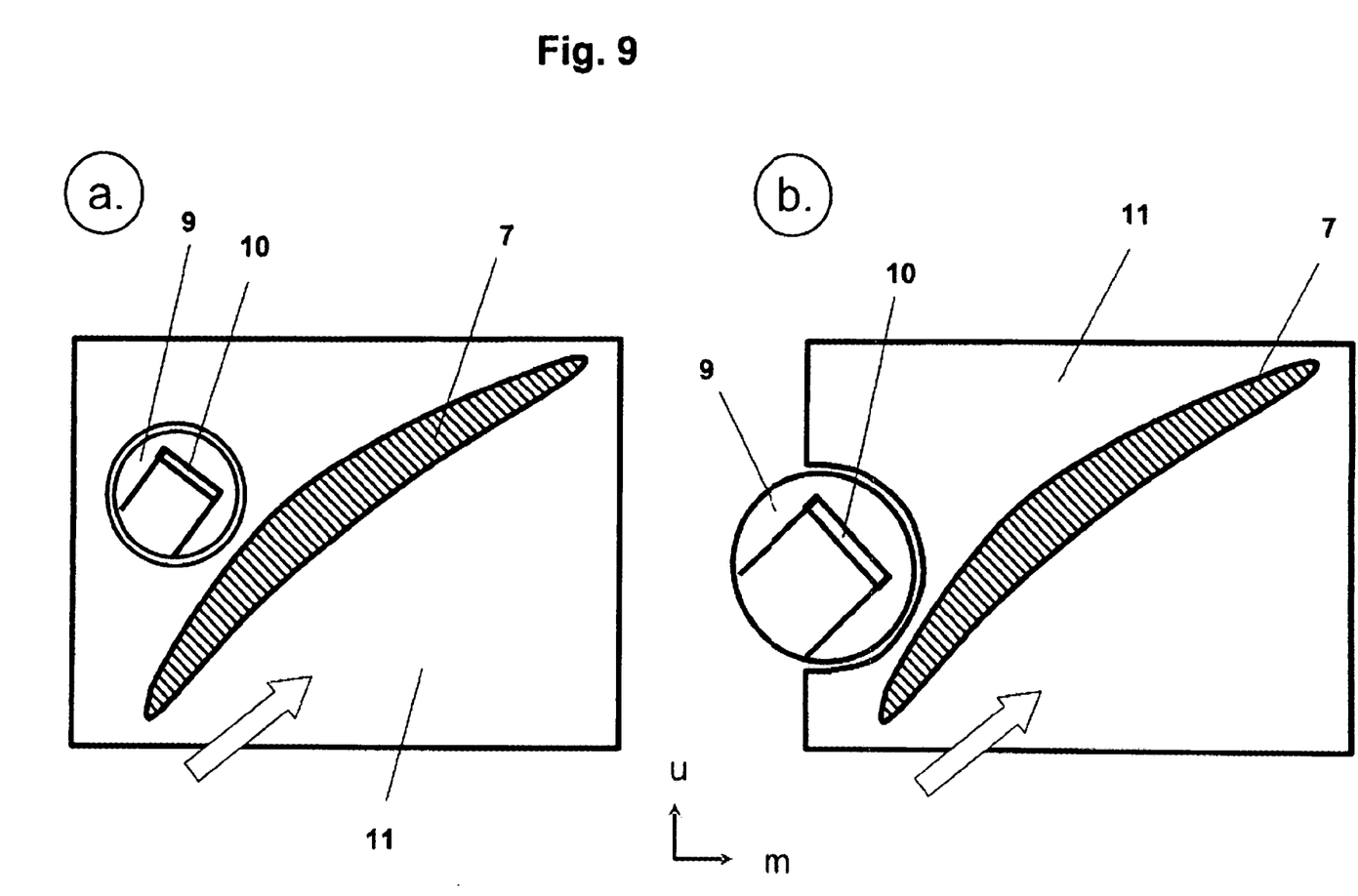
FIG. 9 shows a fluid injector assembly in accordance with the present invention along view X-X, with the injector insert in the area of a blade root.

Further characteristics of the solution according to the present invention are described in conjunction with section X-X, see FIG. 9.

FIG. 9 shows the arrangement according to the present invention in section X-X by way of two examples. The two partial figures of FIG. 9 represent a blade platform 11 on which a blade profile is provided. In the two partial figures, different types of engagement of the fluid injector insert 9 into the bladed space and into the blade platform 11 are shown. Partial figure a) shows a round fluid injector insert 9 which is partly arranged in the bladed space and entirely in the blade platform 11 and which is inclined to the meridional direction m at a certain angle, preferably in the vicinity of the blade suction side. Particularly advantageous is an arrangement of the fluid injector insert 9 in the vicinity of a blade suction side and upstream of a limit located downstream of the blade leading edges by 40 percent of the meridional extension of the blade profile on the flow path rim considered. Partial figure b) shows a round fluid injector insert 9 which is partly arranged in the bladed space and partly in the blade platform 11 and which is inclined to the meridional direction m at a certain angle. preferably in the vicinity of the blade suction side. The shape of the blade platform 11 is here shown rectangular, but blade platforms of the parallelogram type can also be part of a solution according to the present invention such that the fluid injector insert 9, if applicable, engages two adjacent blade platforms or two adjacent blade roots, respectively.

Figure 10:
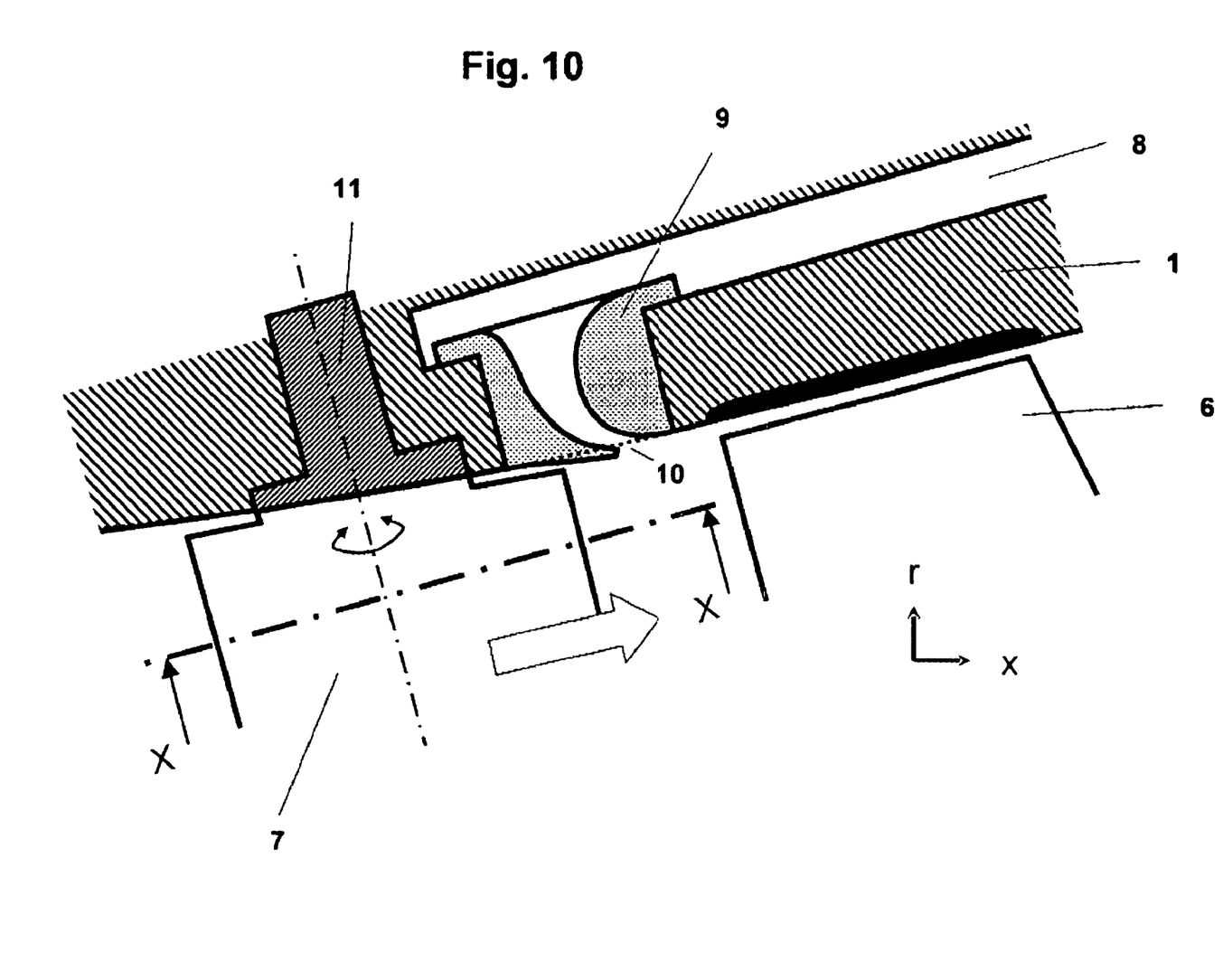
FIG. 10 shows a fluid injector assembly in accordance with the present invention along section Z-Z, with the injector insert downstream in the rotational area of a variable blade.

In FIG. 10, the fluid injector insert 9 is, in accordance with the present invention, provided in the area of a blade end of a rotor blade row or a stator vane row, with the blades being rotatable about an axis (variable blades), such that the fluid injector insert 9 engages the bladed space as referred to the meridional direction, and, thus, the blade trailing edges are arranged downstream of confining edges of the fluid injector insert 9. The representation here selected shows a variable blade row upstream of a blade row with radial gap. As indicated here, the trailing edge of the variable blade may pass over at least parts of the fluid injector insert 9 as it rotates about the setting axis. Further features of the solution according to the present invention are described in conjunction with section X-X, see FIG. 11.

Figure 11:
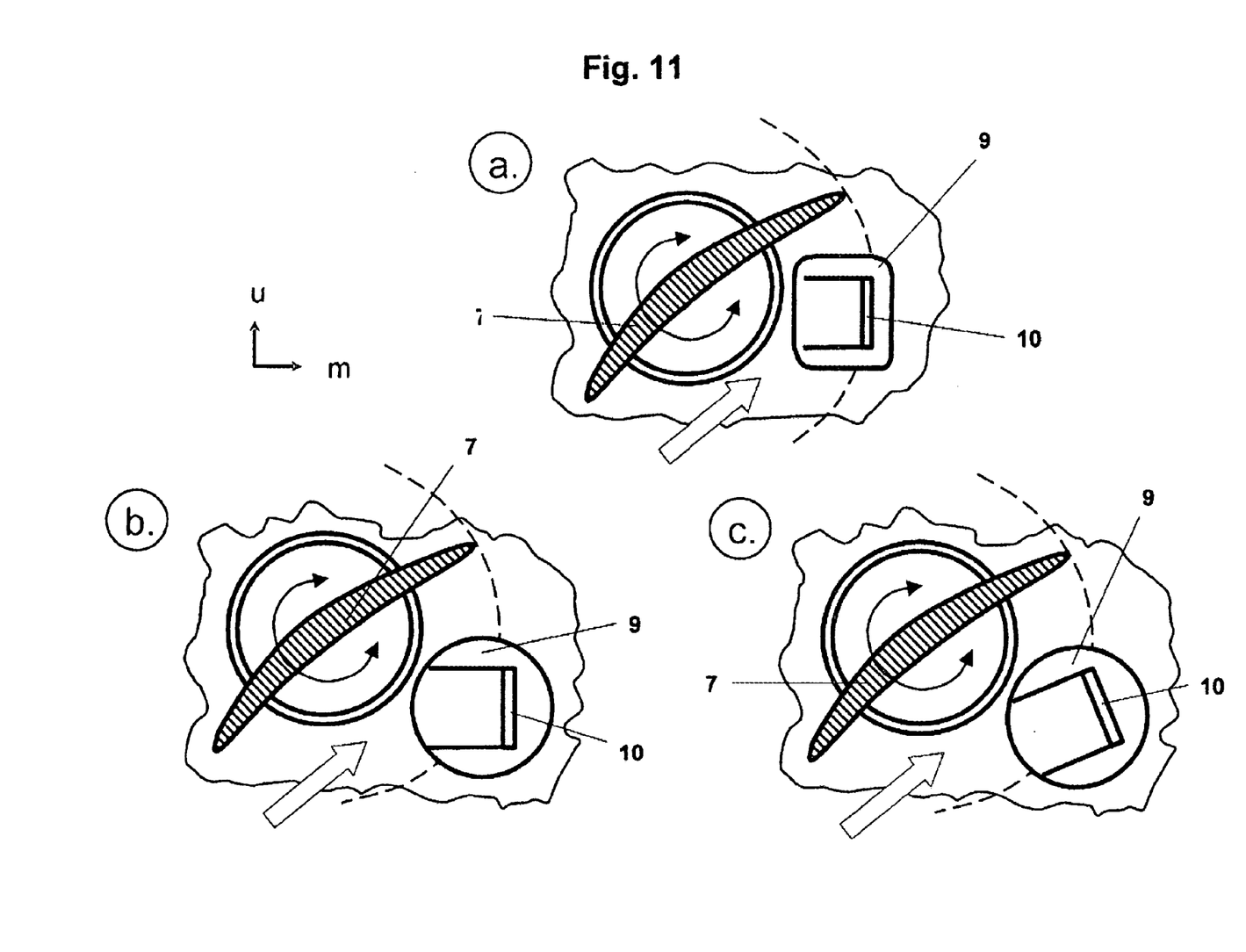
FIG. 11 shows a fluid injector assembly in accordance with the present invention along view X-X, with the injector insert downstream in the rotational area of a variable blade.

FIG. 11 shows the arrangement according to the present invention in section X-X by way of three examples. All three partial figures of FIG. 11 represent a cutaway area of a main flow path wall in which a variable blade is located. The trailing edge of the variable blade moves along the broken trailing-edge rotating circle as the blade rotates. According to the present invention, at least one fluid injector insert 9 is provided within the trailing-edge rotating circle. The three partial figures show different configurations of meridional engagement of the fluid injector insert 9 into the bladed space according to the present invention. Partial figure a) shows a fluid injector insert 9 which is oriented in the meridional flow direction and has an essentially rectangular front face. Partial figure b) shows a fluid injector insert 9 which is oriented in the meridional flow direction and has an essentially circular front face. Partial figure c) shows a fluid injector insert 9 which is oriented obliquely to the meridional direction and has a circular front face.

Figure 12:
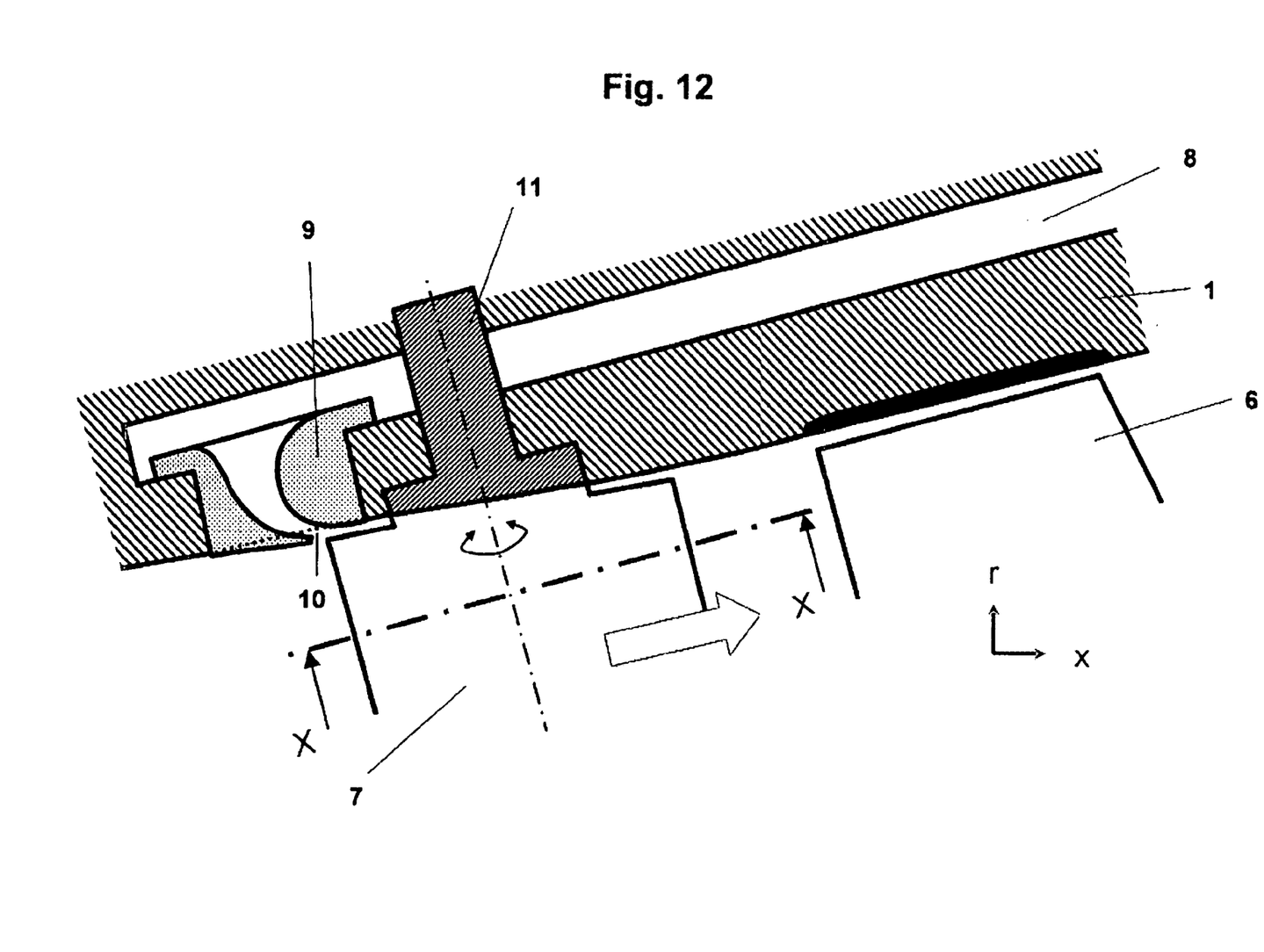
FIG. 12 shows a fluid injector assembly in accordance with the present invention along section Z-Z, with the injector insert upstream in the rotational area of a variable blade.

In FIG. 12, the fluid injector insert 9 is, also in accordance with the present invention, provided in the area of a blade end of a variable rotor blade or stator vane row, such that the fluid injector insert 9 engages the bladed space as referred to the meridional direction, and, thus, the blade leading edges are arranged upstream of confining edges of the fluid injector insert 9. The representation here selected shows a variable blade row upstream of a blade row with radial gap. As indicated here, the leading edge of the variable blade may pass over at least parts of the fluid injector insert 9 as it rotates about the setting axis. Further features of the solution according to the present invention are described in conjunction with section X-X, see FIG. 13.

Figure 13:
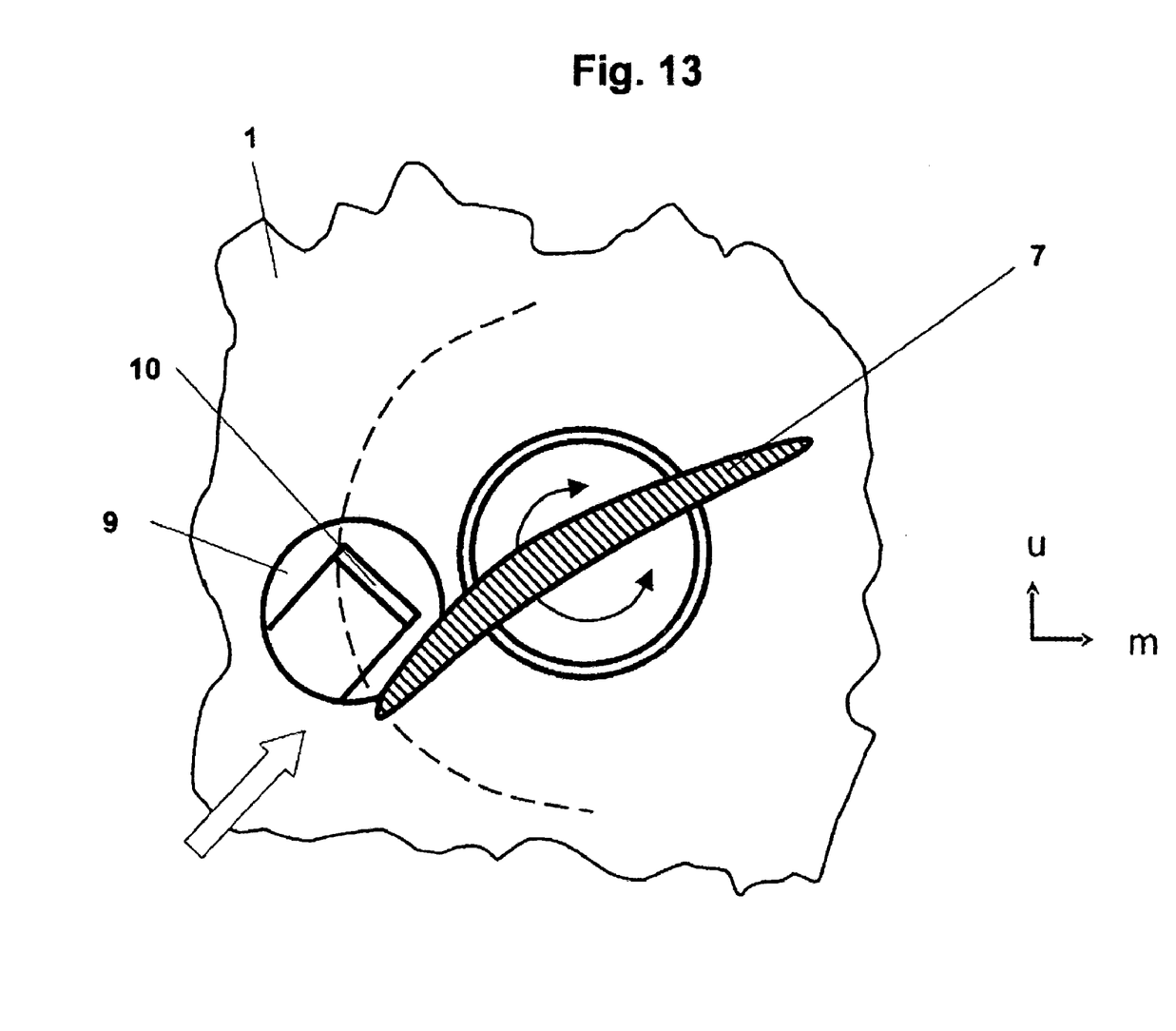
FIG. 13 shows a fluid injector assembly in accordance with the present invention along view X-X, with the injector insert upstream in the rotational area of a variable blade.

FIG. 13 shows the arrangement according to the present invention in section X-X. The leading edge of the variable blade moves along the broken leading-edge rotating circle as the blade rotates. In accordance with the present invention, at least one fluid injector insert 9 is provided within the leading-edge rotating circle and is in meridional engagement with the bladed space.

The fluid flow machine according to the present invention is preferably provided such that the fluid flow machine has at least one fluid injector assembly in the rim area of the bladed main flow path to generate a jet which is essentially tangentially directed along the main flow path wall, with the hub and casing components confining the main flow path of the fluid flow machine accommodating at least one fluid supply chamber, at least one opening being provided in one of the hub and casing components which extends continuously from a fluid supply chamber to the main flow path and accommodates an insert suitable for the injection of fluid, at least one said fluid injector insert being firmly connected to a component immediately adjoining the fluid supply chamber by way of threaded connection, welded connection, interference fit or joining so that fluid is enabled to flow out of the fluid supply chamber and into the injector insert without leakage, at least one said fluid injector insert extending through at least one wall of one of the hub and casing components to the main flow path, with, in particular, at least one said fluid injector insert being arranged upstream of the radial gap of a rotor blade or stator vane row provided with free blade ends, at least one said fluid injector insert being provided at least partly in the area of the radial gap of a rotor blade or stator vane row provided with free blade ends and said fluid injector insert being at least partly associated with the confinement of the radial gap, at least one said fluid injector insert in the area of a fixed blade end being provided at least partly within the bladed area of this rotor blade or stator vane row, at least one said fluid injector insert passing through at least one blade component, at least one said fluid injector insert in the area of the blade trailing edge being arranged at least partly in engagement with at least one blade platform and/or at least one blade root, at least one said fluid injector insert being arranged within the blade passage between two adjacent blades, at least one said fluid injector insert in the area of the blade leading edge being arranged at least partly in engagement with at least one blade platform and/or at least one blade root, at least one said fluid injector insert being provided in the area of a blade end of a rotatably variable rotor blade or stator vane, at least one said fluid injector insert being provided at least partly within the area between the extreme positions established by the rotating circles of the blade leading and trailing edges upstream and downstream in meridional flow direction, at least one said fluid injector insert being provided at least partly downstream of the rotating circle of the blade leading edge, at least one said fluid injector insert being provided at least partly upstream of the rotating circle of the blade trailing edge, at least one said fluid injector insert being provided in the vicinity of a blade suction side and/or at least one said fluid injector insert being arranged upstream of a limit located downstream of the blade leading edges by 40 percent of the meridional extension of the blade profile on the flow path rim considered.

Accordingly, the fluid flow machine according to the present invention enables a high degree of space-saving influence on the boundary flow to be achieved while considerably reducing the constructional effort and cost investment. Depending on the degree of utilization of the concept, improvement in efficiency of up to 1 percent is obtainable.

| List of reference numerals | |
| --- | --- |
| 1 | Casing/casing contour |
| 2 | Annulus duct/flow duct |
| 3 | Rotor drum/hub/hub contour |
| 4 | Machine axis |
| 5 | Inlet guide vane assembly |
| 6 | Rotor/rotor blade/rotor blade row |
| 7 | Stator/stator vane/stator vane row |
| 8 | Fluid supply chamber |
| 9 | Injector insert |
| 10 | Injector nozzle |
| 11 | Blade root/blade platform |

What is claimed is:

1. A fluid flow machine, comprising:
   a hub which is rotatable about a machine axis;
   a casing wall;
   a flow duct for fluid confined by the hub and the casing wall;
   a fluid supply chamber positioned in at least one of an area of the casing wall and an area of the hub;
   at least one row of rotor blades attached to the hub and positioned in the flow duct for adding energy to the fluid in the flow duct;
   a bore positioned along the flow duct axially between a leading edge and a trailing edge of the hub in at least one of the casing wall and the hub; the bore in flow connection with the fluid supply chamber,
   a separate injector insert positioned in the bore and extending radially into the flow duct, the injector insert in flow connection with the fluid supply chamber, the injector insert including an injector nozzle for supplying fluid from the fluid supply chamber into the flow duct, the injector insert being closely connected to a wall of the fluid supply chamber, the injector insert also being a separate component from blade and vane components.

2. The fluid flow machine of claim 1, wherein the injector insert is connected to the wall of the fluid supply chamber in a leakage-free manner.

3. The fluid flow machine of claim 1, wherein the injector insert is threaded to the wall of the fluid supply chamber.

4. The fluid flow machine of claim 1, wherein the injector insert is welded to the wall of the fluid supply chamber.

5. The fluid flow machine of claim 1, wherein the injector insert is connected to the wall of the fluid supply chamber by an interference fit.

6. The fluid flow machine of claim 1, wherein the injector insert is joined to the wall of the fluid supply chamber.

7. The fluid flow machine of claim 1, wherein the injector insert is positioned upstream of a radial gap of at least one of a blade row and a vane row having free blade ends.

8. The fluid flow machine of claim 7, wherein the injector insert at least partly confines the radial gap.

9. The fluid flow machine of claim 8, wherein a circumferential relative movement is provided between the injector insert and the respective blade row and an injector jet orientation has a vector component in a direction of advance, as viewed from the injector, such that the injector jet orientation includes a positive angle $\alpha$ with a meridional flow direction.

10. The fluid flow machine of claim 9, wherein, a value for the angle $\alpha$ lies in a range defined as follows:

$$\arctan[\tan(90°-\mathrm{lambda})+1]<\alpha<\arctan[\tan(90°-\mathrm{lambda})+4],$$

with lambda being a stagger angle of the blades at a respective blade end.

11. The fluid flow machine of claim 1, wherein the injector insert is at least partly positioned within a bladed area of a blade or vane row.

12. The fluid flow machine of claim 11, wherein the injector insert passes through at least one blade component.

13. The fluid flow machine of claim 12, wherein the injector insert, in an area of a blade trailing edge, is at least partly in engagement with at least one of a blade platform and a blade root.

14. The fluid flow machine of claim 13, wherein the injector insert, in an area of a blade leading edge, is at least partly in engagement with at least one of the blade platform and the blade root.

15. The fluid flow machine of claim 14, wherein the injector insert is positioned within a blade passage between two adjacent blades.

16. The fluid flow machine of claim 11, wherein the injector insert is at least partly positioned within a rotating circle of at least one of a leading edge and a trailing edge of at least one of a variable rotor blade and a variable stator vane.

17. The fluid flow machine of claim 1, wherein the injector insert is at least partly positioned within a rotating circle of at least one of a leading edge and a trailing edge of at least one of a variable rotor blade and a variable stator vane.

18. The fluid flow machine of claim 1, wherein the injector insert passes through at least one blade component.

19. The fluid flow machine of claim 1, wherein the injector insert, in an area of a blade trailing edge, is at least partly in engagement with at least one of a blade platform and a blade root.

20. The fluid flow machine of claim 1, wherein the injector insert, in an area of a blade leading edge, is at least partly in engagement with at least one of the blade platform and the blade root.

* * * * *